United States Patent [19]

Wren

[11] Patent Number: 4,630,289

[45] Date of Patent: Dec. 16, 1986

[54] EMERGENCY LOCATOR TRANSMITTER INCIDENT TIME CORRELATOR

[76] Inventor: Paul E. Wren, 240 Berrywood Drive, Severna Park, Md. 21146

[21] Appl. No.: 106,309

[22] Filed: Dec. 21, 1979

[51] Int. Cl.⁴ .............................................. H04N 1/02
[52] U.S. Cl. ......................................... 375/71; 455/98; 340/981; 340/539; 441/11
[58] Field of Search ............... 375/68, 70, 71; 455/12, 455/35–38, 95, 96, 98, 99, 100, 127; 340/25, 29, 309.15, 534, 539, 981, 982; 343/100 GT, 101, 102, 112 R; 58/145 R, 23 C; 9/33, 9; 368/244; 441/11, 89

[56] References Cited

U.S. PATENT DOCUMENTS

| | | | |
|---|---|---|---|
| 2,825,803 | 3/1958 | Newbrough | 455/98 |
| 3,643,162 | 2/1972 | Ady | 375/68 |
| 4,077,005 | 2/1978 | Bishop | 455/12 |
| 4,101,894 | 7/1978 | Warner | 343/112 R |
| 4,218,654 | 8/1980 | Ogawa | 455/12 |
| 4,232,391 | 11/1980 | Zanutti | 455/96 |

OTHER PUBLICATIONS

Specification for the Sarsat Experimental 406 MHZ ELT and EPIRB Electronics, Sarsat Document No. D-7, Nov. 14, 1979.
Minimum Performance Standards–Emergency Locator Transmitters, Document No. DO-147, Nov. 5, 1970.
Radio Technical Commission for Aeronautics, Prepared by SC-119.

Primary Examiner—Tommy P. Chin
Attorney, Agent, or Firm—John O. Tresansky; John R. Manning; Ronald F. Sandler

[57] ABSTRACT

In an emergency locator transmitter of a type wherein a standard distress signal is transmitted following a distress incident, the distress signal is encoded with data identifying the absolute time of the incident or the amount of time that has elapsed since the incident occurred. Distress waveform modulation of the carrier is periodically interrupted for insertion of the time signal. In a preferred embodiment, wherein the distress signal includes information burst signals that are periodically transmitted, e.g., every 50 seconds, timing pulses generated synchronously with the burst signals are supplied to a divider circuit for division by a predetermined integer to develop extended time base pulses, e.g., one hour pulse intervals. The extended pulses are accumulated in a binary counter and combined with the information burst signals.

15 Claims, 4 Drawing Figures

//4,630,289//

EMERGENCY LOCATOR TRANSMITTER INCIDENT TIME CORRELATOR

ORIGIN OF THE INVENTION

The invention described herein was made by an employee of the U.S. Government, and may be manufactured and used by or for the Government for governmental purposes without the payment of any royalties thereon or therefor.

TECHNICAL FIELD

The present invention relates generally to emergency locator transmitters which transmit standard distress signals on legislatively assigned distress frequencies in response to a distress incident, and more particularly, to a method of and system for encoding the distress signals with data associated with the incident time of the distress.

BACKGROUND ART

There are presently in existence in the United States approximately 190,000 emergency locating transmitters (ELTs) required by law on all small aircraft travelling more than 25 miles from an airport and about 6,000 emergency position indicating radio beacons (EPIRBs) required on certain classes of marine vessels. ELTs and EPIRBs are essentially the same device which transmits an audio tone on legislatively assigned frequencies of 121.5 MHz and 243 MHz indicating that a distress incident has occurred. The audio tone generated by these devices is provided by a distress modulation signal legislatively assigned to have a 2 Hz to 4 Hz cyclic waveform wherein each cycle has a downward sweep of at least 700 Hz between 1,600 Hz and 300 Hz. The distress waveform demodulated in a conventional AM receiver provides a sirenlike audio tone that is recognized by distress band observers. The Air Force Rescue Coordination Center (AFRCC), for example, receives information from others, i.e., FAA flight service stations, airports, the Civil Air Patrol, etc., who monitor the 121.5 MHz and 243 MHz frequencies and respond to distress signals by notifying search and rescue personnel, (SAR), such as the Civil Air Patrol, to search for the location of the distress transmission and initiate rescue operations. Since the distress transmission contains no information other than the fact of a distress, however, the SAR have no way of determining the time of occurrence of the distress. Knowledge of the incident time of the distress would, for example, enable the rescue coordinator to assign priorities and resources in a multiple emergency situation so that the emergencies that are critical from a time survival relationship are attended to early. Knowledge of the duration of the emergency incident also enables correlation of incident time to proximity weather phenomena or prevailing tides. Statistics can be compiled based upon these parameters and rescue times to develop predictive data.

Satellite aided search and rescue systems are presently being developed to augment existing search and rescue force capabilities to detect and locate ELT/EPIRB signal sources by improving the distress monitoring coverage of the Continental United States, Alaska, the U.S. maritime areas, Canada and the Canadian maritime areas, and by improving the position location determination accuracy of the distress incident using Doppler techniques. The orbiting satellites will respond to low level 121.5 MHZ distress signals as well as high level 406 MHz data signals in a form specified in the U.S. by the Federal Communications Commission and internationally by the Radio Regulations of the International Telecommunication Union. The 406 MHz information bursts contain information concerning the distress incident, such as user identification, country of origin and situation, e.g., ship sinking. The 406 MHz information is either processed on board in the satellite or relayed to ground based instrumentation for processing. The low level 121.5 MHz signal is generated during the off periods of the 406 MHz information bursts to enable SAR to perform a final location following course location determination by satellite to within a radius of about one kilometer.

One object of the present invention, therefore, is to provide a method of and system for encoding an ELT/EPIRB transmission with distress incident time information.

Another object of the present invention is to provide a method of and system for identifying the distress incident time in an ELT/EPIRB transmission.

Another object of the present invention is to provide a method of and apparatus for encoding an ELT/EPIRB transmission with data identifying the elapsed time of the distress.

Yet another object is to provide a method of and system for encoding information burst signals generated by an ELT/EPIRB to include distress incident time information.

Still another object of the invention is to provide a method of and system for providing distress incident time information in an ELT/EPIRB transmission that is compatible with present ground based as well as satellite augmented search and rescue operations.

The above and still further objects, features and advantages of the present invention will become apparent upon consideration of the following detailed description of specific embodiments thereof, especially when taken in conjunction with the accompanying drawings.

DISCLOSURE OF INVENTION

In a distress signal transmitter of a type which following a distress occurrence generates continuous audio modulated signals on legislatively assigned 121.5 and 243 MHz carrier frequencies, distress incident time pulses are generated by a clock initiated by turn-on of the transmitter. The distress waveform modulation of the 121.5 and 243 MHz carriers is periodically interrupted for insertion of absolute elapsed time data or elapsed time data. In another type of transmitter wherein the distress transmission is in the form of periodic, digitally encoded information bursts on a 406 MHz carrier frequency, timing pulses synchronized to the information burst signals are supplied to a digital divider circuit to develop extended time base pulses for accumulation in a binary counter. The number of information bursts indirectly counted by the binary counter corresponds to transmission time interval which identifies the time elapsed since the incident occurred. The counter signal is supplied to a conventional telemetry formatter to be combined with other information in the data field of the information burst signals.

BEST MODE FOR CARRYING OUT THE INVENTION

Figure 1:
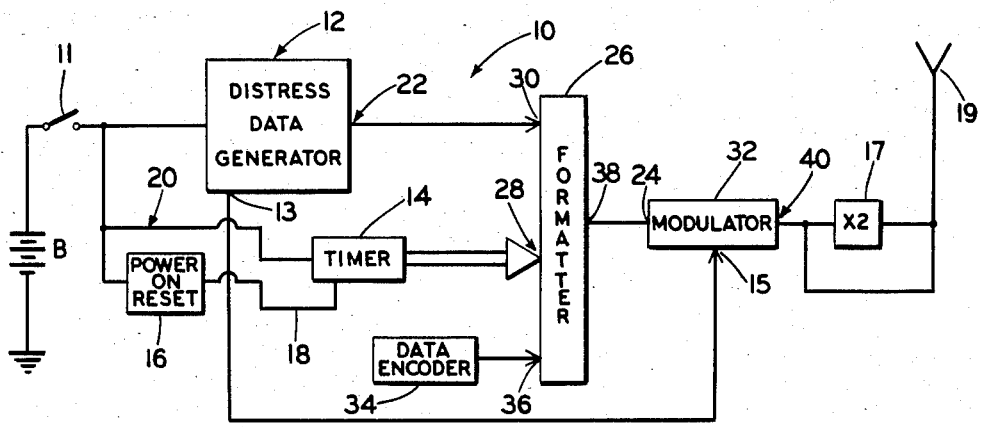
FIG. 1 is a block diagram showing an ELT/EPIRB of a type generating standard distress signals at 121.5 MHZ and 243 MHz carrier frequencies including circuitry in accordance with the present invention for incorporating incident time data into the distress signals.

Referring to FIG. 1, an emergency locating transmitter (ELT) or emergency position indicating radio beacon (EPIRB) identified generally by the numeral 10, is responsive to automatic or manual closure of a switch 11 that supplies power from battery B to the ELT/EPIRB. In an ELT, closure of the switch 11 is generally crash responsive whereas the switch 11 in an EPIRB is generally water responsive. The ELT/EPIRB 10 conventionally contains an oscillator with a frequency doubler which allows for transmission of carrier signals respectively on 121.5 MHz and 243 MHz legislatively assigned distress frequencies. The two carrier signals are modulated by a standardized distress waveform which is an audio tone sweeping downwardly for at least 700 Hz within frequencies of 1,600 Hz and 300 Hz at a rate of 2 Hz to 4 Hz to develop a siren-like sound in the speaker of a conventional AM receiver. The 121.5 MHz and 243 MHz frequencies are monitored by FAA flight service stations, airports, the Civil Air Patrol, etc. Information relating to distress signals are sent to the Air Force Rescue Coordination Center (AFRCC) which alerts search and rescue personnel to initiate operations to determine the origin of the distress signal and to initiate rescue. Details of the standardized ELT/EPIRB specifications are given in "Minimum Performance Standards-Emergency Locator Transmitters", Document No. DO-147, published Nov. 5, 1970 by the Radio Technical Commission For Aeronautics, prepared by Special Committee 119 of the Radio Technical Commission for Aeronautics (RTCA).

The ELT/EPIRB system 10 shown in FIG. 1 is activated upon closure of switch 11. The standard distress signals to be modulated on the 121.5 MHz and 243 MHz carrier signals are generated by a conventional distress data generator 12 and are supplied via line 22 to input 30 of a telemetry formatter 26. The signal on line 22 generated by unit 12 to formatter 26 is a square wave having a repetition rate sweeping downwardly for at least 700 Hz between, 1,600 Hz and 300 Hz (see document number DO.147, supra). Also contained in conventional generator 12 is a 121.5 MHz oscillator which is outputted on line 13. The output of a timer 14, discussed in detail below, is supplied to input 28 of the formatter 26 and other data specified by regulations for satellite processing, such as user classification, country of origin, etc., associated with the distress signal, are supplied by data encoder 34 to input 36 of the formatter in the form of binary coded parallel signals.

Figure 2:
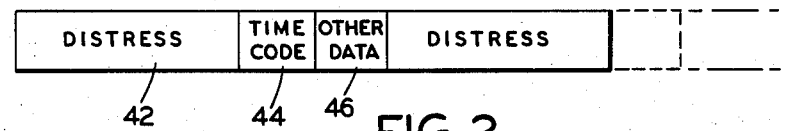
FIG. 2 is a representation of an exemplary format of a composite signal generated by the circuit of FIG. 1.

Formatter 26, which is preferably a suitably programmed, conventional microprocessor, formats the distress signal at input 30, the timer signal at input 28 and other data at input 36 into successive data fields, as shown in FIG. 2 onto output line 38. The format of the output signal of formatter 26, as shown in FIG. 2, consists of a first field 42 carrying the standard distress signal for a predetermined time period, e.g., 30 seconds followed by second and third successive fields 44 and 46 containing respectively the time code and other data, for a shorter period, e.g. 0.5 second.

The digital data transmitted along with the standard distress signals preferably are encoded in Manchester Code at a bit rate and data length depending upon international agreement. The digital data including time code are decoded at a receiver (not shown) to provide the absolute or elapsed time associated with the distress incident. Of particular importance, the relatively short transmission time apportioned to the time code field 44 and other data field 46 compared to the transmission time of a complete transmission cycle (fields 42, 44 and 46) does not significantly interfere with the characteristic siren-like tone of the standard distress signals on the 121.5/243 MHz bands and does not violate present international and domestic regulations.

The timer 14 (FIG. 1), initiated by power switch 11 and a conventional power on reset circuit 16, generates a timing signal that is combined with the output of the distress data generator 12 in the formatter 26 to form a composite serial digital signal. Timer 14 is a conventional binary clock circuit, such as a binary counter driven by an internal reference pulse source (not shown). The timer 14, upon closure of the switch 11, is reset by the output of power-on reset 16 on line 18 and enabled by a positive voltage generated by battery B on line 20.

The output of timer 14 supplied to the formatter at input 28 may be a binary coded parallel representation of the elapsed time of transmission of the distress signal initiated at the incident of the distress. Alternatively, the timer 14 may be of a type that is enabled, upon closure of switch 12, to encode the absolute time of the distress incident to be incorporated into the distress signal. In the latter case, it is of course necessary to maintain the timer 14 energized independently of switch 11 to sustain the timer for continuous time accumulation. Time accumulation terminates, however, when the ELT/EPIRB system is activated by switch 11. The term "time code" referred to hereinafter thus refers to an encoded representation of either the absolute incident time of the distress signal transmission, e.g., 12:00 p.m., or the elapsed time, e.g., 4 hours.

Output 38 of formatter 26 is connected to the data input 24 of a standard carrier signal digital modulator 32. The carrier input 15 of the modulator 32 is connected to the 121.5 MHz oscillator output at output 13 of the distress data generator 12. The modulator 32 thus modulates the 121.5 MHz carrier with the serial data output of the formatter 26. The output 40 of modulator 32 is connected to both the antenna 19 and a standard frequency doubler 17 also connected to the antenna. Thus, serial digital data signals, including elapsed or absolute time are provided at 121.5 MHz and 243 MHz carrier frequencies.

Figure 3:
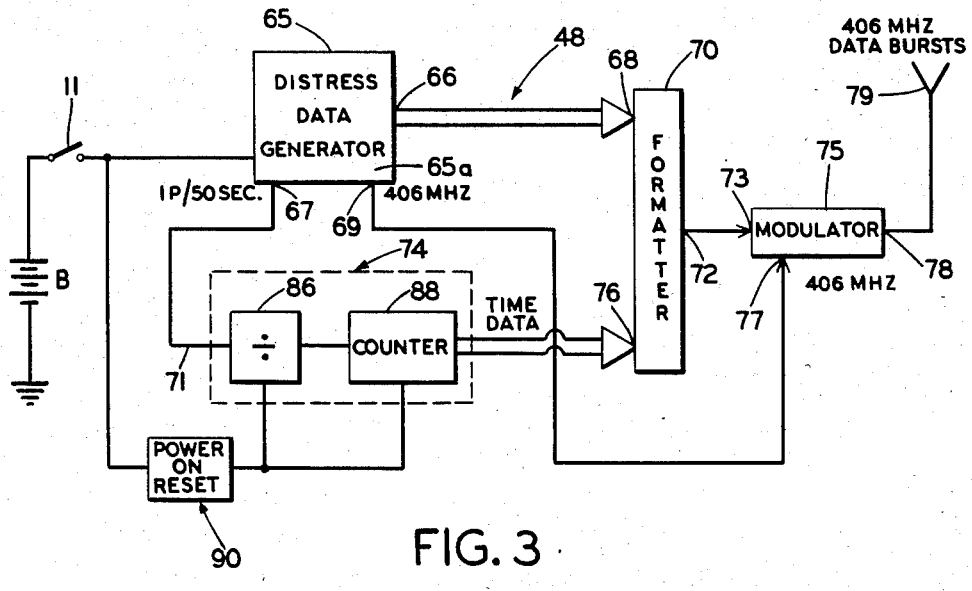
FIG. 3 is a block diagram of another type of ELT/EPIRB of a type generating periodic information burst signals in response to closure of a distress switch, wherein the burst signals are encoded with incident time data.
Figure 4:
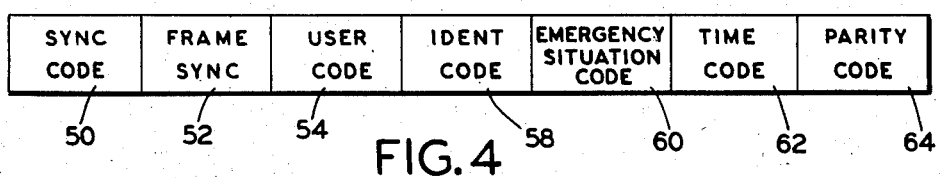
FIG. 4 is a representation of an exemplary format of a composite information burst signal generated by the ELT/EPIRB of FIG. 3.

Referring to FIG. 3, a second embodiment of the invention identified generally by 48 is shown wherein time code data are incorporated into an information signal as shown in FIG. 4 which is modulated onto a 406 MHz carrier signal. The 406 MHz band may be received by satellite carried instrumentation augmenting land based SAR instrumentation (both not shown). The 406 MHz transmission is in the form of digital data encoded in Manchester Code having specifications as set forth in FIG. 2.2 of Specification for the Sarsat Experimental 406 MHz ELT and EPIRB Nov. 14, 1979. The digital data in the 406 MHz channel comprises information burst signals designed to access the satellite via a coded address as well as to provide identification of the user and capability for situation coding.

In addition to the 406 MHz burst signals generated by the ELT/EPIRB system 48, a low level distress signal (not shown) may be transmitted on the 121.5 MHz band during the off periods of the burst signals. The information bursts may be received by an orbiting satellite or spacecraft where on-board instrumentation (not shown) either processes the burst signals in order to later develop course location (within approximately a two kilometer radius) by employing ground processing equipment or relays the burst signal and associated data in real time to local user terminals which track the satellite and further relay the ELT/EPIRB signals to search and rescue forces (SAR). The low level 121.5 MHz signal may be used by SAR to locate the precise positions of the signal source within the one kilometer course location provided by the satellite relayed data. The 406 MHz information burst as described in the Sarsat specification, supra, identifies origin of the distress transmission as well as user situation and other information.

The ELT/EPIRB system 48 described in the Sarsat specification transmits upon closure of distress switch 11 and in response to a 50 second interval timing pulse of approximately 550 millisecond duration information burst signal at a repetition rate of 1 signal every 50 seconds. In accordance with the invention, the 50 second timing pulse is used to establish a timing base for measuring elapsed transmission time which is digitally encoded and combined with the data in the information burst signals, to provide composite signals having the format shown in FIG. 4.

Referring to FIG. 4, data synchronization is provided by sync and framing fields 50, 52. The user and identification codes in fields 54 and 58 identify the country of origin and user class, e.g., aircraft, respectively. In field 60, the emergency situation code identifies the type of distress, e.g., overturned vessel, associated with the distress incident. Following field 60 is time code field 62 provided in accordance with the invention further followed by a standard parity field 64.

Only the provision of time code field 62 within the information burst signal shown in FIG. 4 constitutes the present invention. The order of the data fields is determined by regulations and the design of receiver instrumentation which do not constitute the present invention.

Referring now to FIG. 3 in more detail, the operation of the second embodiment of the invention will be described. The ELT/EPIRB system 48 is energized by closure of switch 11. The conventional distress data generator 65 contains the necessary preprogrammed information for a particular ELT/EPIRB in a conventional manner, i.e., Sync code, Frame sync, User code, etc., and is provided in parallel to lines 66. The sync code is a transmitted serial pattern that alerts a satellite processor (not shown) to align the satellite receiver to a mode suitable for receiving ELT/EPIRB signals. The frame sync is a transmitted serial pattern which identifies the transmission as a valid ELT/EPIRB, i.e., it is a verification code to distinguish the ELT/EPIRB transmission from other transmissions. The user code is unique to each user, i.e., it is a transmission characteristic of a particular ELT/EPIRB. The distress data generator 65 generates these codes within the ELT/EPIRB in parallel and this data is connected to input 68 of formatter 70.

Also contained within the distress data generator 65 is a timing pulse generator 65a with an output at 67 of one pulse per 50 seconds, supplied to input 71 of timer 74, as well as a stable oscillator with an output at 69 of 406 MHz. Timer 74 includes a divider 86 which in turn drives counter 88. The timing pulse on input 71 is divided by divider 86 to provide one pulse per hour. The one pulse per hour signal is inputted to binary counter 88 which includes a sufficient number of stages to store, for example, a 31 hour count without reset. Divider 86 and counter 88 are automatically set to zero only when switch 11 is activated by the power on reset 90.

The parallel output of the counter, which represents accumulated count in hours from ELT/EPIRB activation, is supplied to formatter 70 at input 76. The formatter 70, which is preferably a programmed conventional microprocessor similar to unit 26 in FIG. 1, takes the parallel data at inputs 68 and 76 and translates the input data to a serial data stream outputted at 72 containing data relating to sync code, frame sync, user code, time, etc., as shown in the format of FIG. 4.

The serial digital data stream at 72 is supplied to input 73 of a standard modulator 75 similar to modulator 32 in FIG. 1 together with the 406 MHz carrier signal from output 69 of the distress data generator 65 to input 77 of the modulator. The serial digital data stream modulated 406 MHz carrier signal is taken from output 78 of the modulator to drive the antenna 79.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. In a distress signal transmitter of a type wherein following a distress incident a characteristic distress signal is transmitted on a predetermined carrier frequency, the improvement comprising: means for generating a start signal at the start of a distress transmission, means for generating a time for transmission signal initiated by said start signal; and means for combining said time signal with said distress signal.

2. The distress signal transmitter of claim 1, wherein said time signal generating means includes means for generating an elapsed time signal synchronized to said start signal.

3. The distress signal transmitter of claim 2 including power on reset switch means, and wherein said time signal generating means includes an elapsed time signal generator initiated by said reset switch means.

4. The distress signal transmitter of claim 1 including signal formatter means for formatting said distress signal and time signal in successive data fields.

5. In a distress signal transmitter of a type wherein following a distress incident, information burst signals are periodically transmitted, a system for identifying a distress time, comprising means for measuring a time associated with the distress and generating a corresponding time signal; means for digitally encoding said time signal; and means for combining said encoded time signal for transmission with said information burst signals.

6. In a distress signal transmitter of a type wherein following a distress incident information bursts are periodically transmitted, a system for identifying a distress time, comprising means synchronized to said information bursts for generating time signals, means for digitally encoding said time signals and means for combining said encoded time signals for transmission with said information burst signals.

7. In a distress signal transmitter of a type wherein following a distress incident information burst signals are periodically transmitted, a system for identifying a distress time, comprising pulse synchronizing means for generating pulses to synchronize said burst signals, means for dividing said pulses, and means for accumulating said divided pulses to develop an accumulated time signal, and encoding means including means for digitally encoding said accumulated time signal for transmission.

8. The transmitter of claim 7 including means for generating data signals, and signal formatter means for formatting said data signals and accumulated time signal in successive data fields.

9. In a distress transmitter of a type wherein following a distress incident information burst signals are periodically transmitted, a system for identifying a distress time interval, comprising means synchronized to said burst signals for generating timing pulses; means for dividing said timing pulses by a predetermined integer n, where $n \neq 0$; means for accumulating said divided pulses; means for digitally encoding said accumulated pulses to develop a time interval signal; and means for combining said time interval signal with said information burst signals for transmission.

10. A method of identifying a distress incident time associated with signals generated by a distress transmitter, comprising the steps of generating a start signal at the start of a distress signal transmission, generating a time signal initiated by the start signal, combining the time signal with the distress signal, and transmitting said combined signal.

11. The method of claim 10, wherein said time signal generating step includes the step of generating an elapsed time signal synchronized to said start signal.

12. The method of claim 10 wherein said time signal generating step includes the step of generating an absolute time signal synchronized to said start signal.

13. The method of claim 12 or 11 including the steps of generating a data signal and formatting said time signal and said data signal in successive data fields.

14. A method of identifying a distress incident time associated with signals generated by a distress transmitter of a type which periodically generates information burst signals following a distress incident, comprising the steps of generating a timing signal during generation of said information bursts, combining said timing signal with said information burst signals to form composite information burst signals, and transmitting said composite signals.

15. A method of identifying a distress incident time associated with signals generated by a distress transmitter of a type which periodically generates information burst signals following a distress incident, comprising the steps of generating timing pulses synchronously with said burst signals; dividing said timing pulses by a predetermined integer n, where $n \neq 0$; accumulating said divided timing pulses; digitally encoding said accumulated pulses, combining said encoded pulses with said information burst signals to form composite information burst signals, and transmitting said composite signals.

* * * * *